US012027750B2

(12) United States Patent
Durocher, Jr. et al.

(10) Patent No.: US 12,027,750 B2
(45) Date of Patent: Jul. 2, 2024

(54) INSIDE PIPE MOUNTING APPARATUS AND METHODS

(71) Applicant: Verizon Patent and Licensing Inc., Basking Ridge, NJ (US)

(72) Inventors: Marc J Durocher, Jr., Auburn, MA (US); Peter R Grondin, Fairport, NY (US); Robert R Sheehan, Florham Park, NJ (US); Erik J Sheehan, Sparta, NJ (US); Shawn C McCourt, Mechanicsburg, PA (US); Thomas M Bausch, Damascus, MD (US); Chad E Fulton, Mount Arlington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 53 days.

(21) Appl. No.: 17/990,923

(22) Filed: Nov. 21, 2022

(65) Prior Publication Data

US 2024/0170827 A1    May 23, 2024

(51) Int. Cl.
*H01Q 1/12*     (2006.01)
*F16M 13/02*    (2006.01)
*H01Q 1/24*     (2006.01)

(52) U.S. Cl.
CPC .......... *H01Q 1/1228* (2013.01); *F16M 13/02* (2013.01); *H01Q 1/246* (2013.01)

(58) Field of Classification Search
CPC ....... H01Q 1/1228; H01Q 1/246; F16M 13/02
USPC .......................................................... 248/157
See application file for complete search history.

(56) References Cited

U.S. PATENT DOCUMENTS

| | | | |
|---|---|---|---|
| 7,744,046 B1* | 6/2010 | Lundy ................... | B60R 11/02 248/219.2 |
| 9,218,019 B2* | 12/2015 | Quijano ................ | F16M 13/02 |
| 10,040,152 B2* | 8/2018 | Kaake ................... | B23Q 3/18 |
| 2012/0217369 A1* | 8/2012 | Sapper ............... | F16M 11/2014 248/458 |
| 2015/0309532 A1* | 10/2015 | Sapper .................. | F16M 11/24 211/26 |

* cited by examiner

*Primary Examiner* — Todd M Epps

(57) ABSTRACT

A mounting device includes a central shaft extending along an axis from a first end to a second end. A first collar and a second collar are mounted to the central shaft. A first portion of a linkage is attached to the first collar, and a second portion of the linkage is attached to the second collar. The linkage has an inflection point located between the first portion and the second portion. A foot pad is attached to the linkage proximate the inflection point. The first collar is movable from a first position to a second position, and when the first collar is in the first position, the foot pad is at a first radial distance from the axis. When the first collar is in the second position, the foot pad is at a second radial distance from the axis. The first radial distance different than the second radial distance.

20 Claims, 11 Drawing Sheets

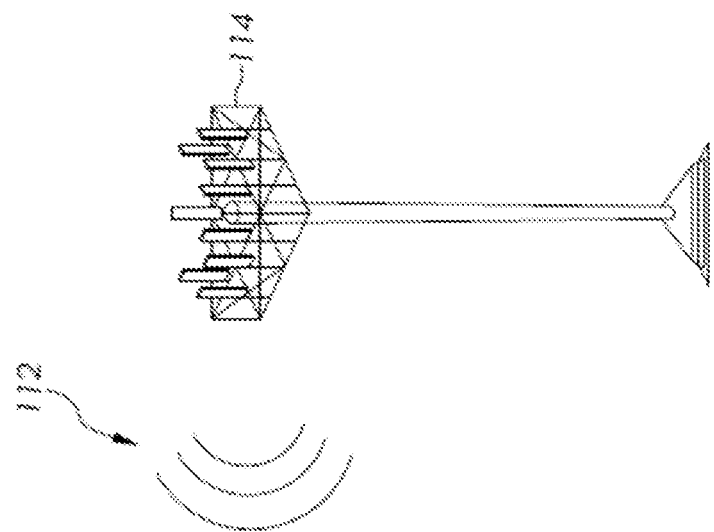
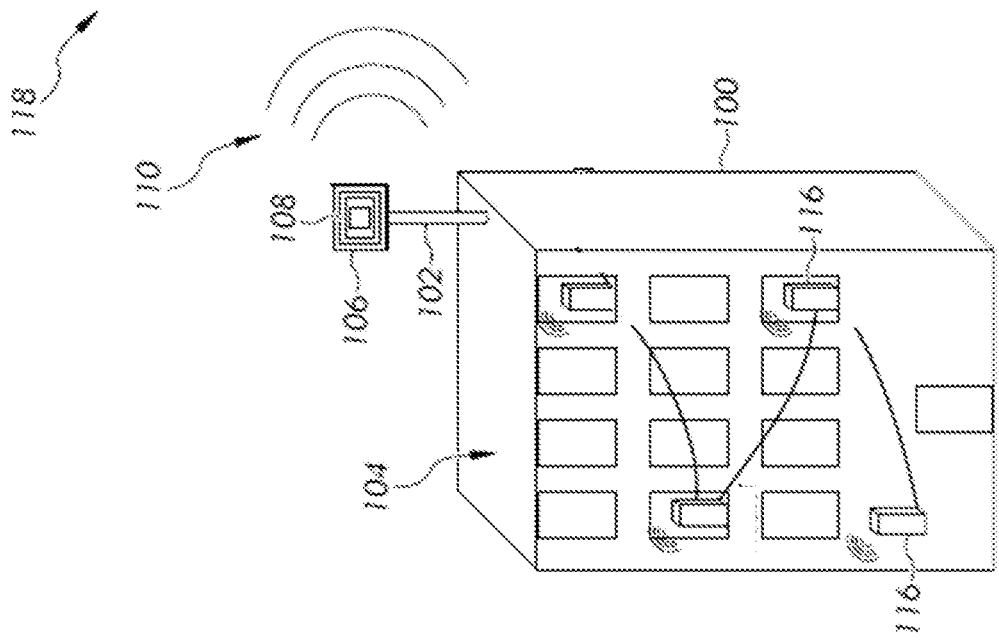
FIG. 1

INSIDE PIPE MOUNTING APPARATUS AND METHODS

BACKGROUND INFORMATION

Wireless networks can include outdoor equipment that can be mounted to a rooftop or a wall of an existing habitable structure. Many telecommunication devices are secured to structures through mounting devices that can be relatively heavy or compromise the sealed envelope of the structure.

BRIEF DESCRIPTION OF THE DRAWINGS

FIG. 1 illustrates an example environment for an exemplary mounting device;

DETAILED DESCRIPTION OF EXAMPLE EMBODIMENTS

Figure 2:
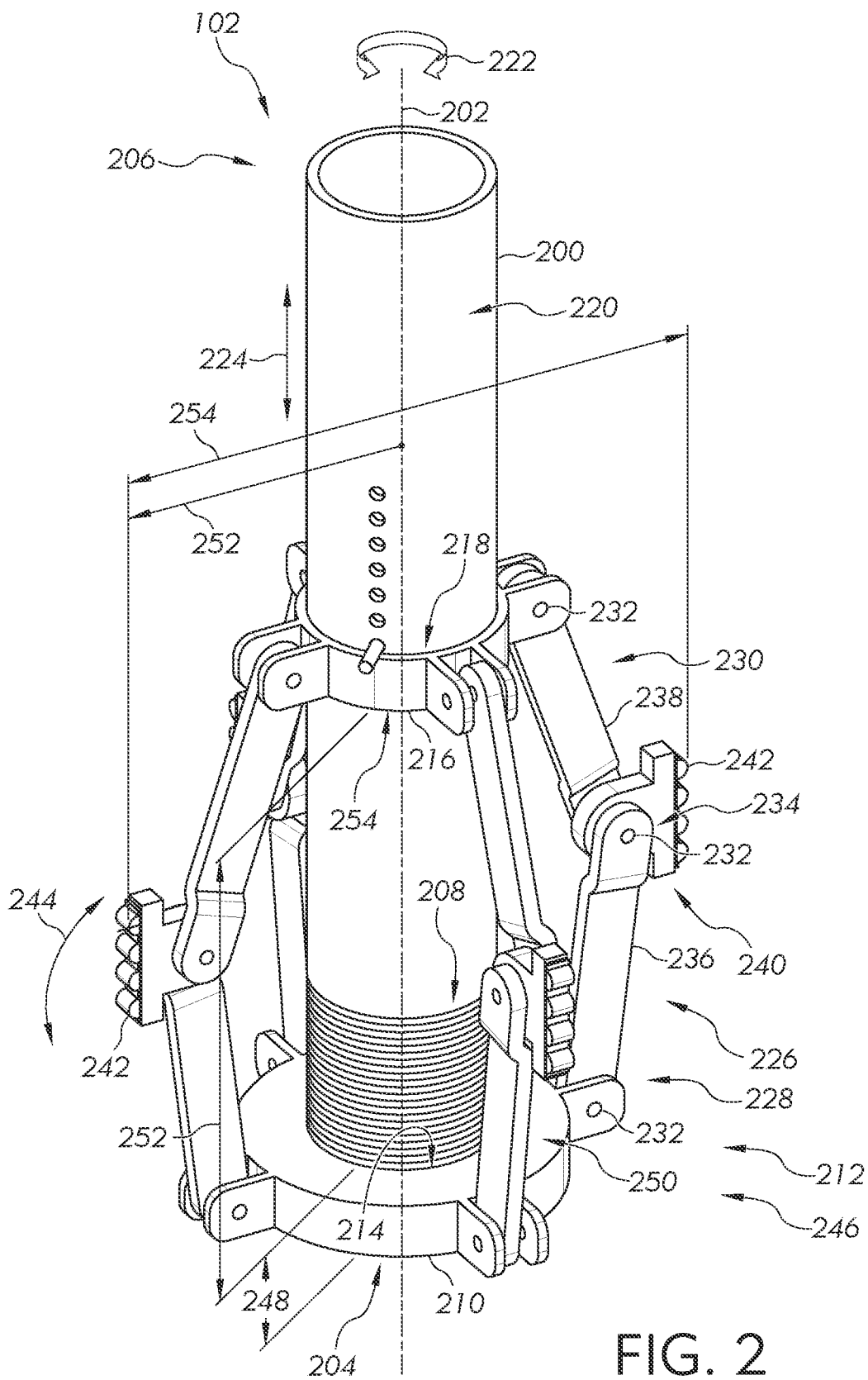
FIG. 2 is a perspective view of an example mounting device having a first collar located at a first position.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

It is to be appreciated that myriad devices and objects are mounted to exterior surfaces of buildings for many reasons including, but not limited to: heating, ventilation, and air conditioning devices; antennae; transponders; storage tanks; process piping; solar panel arrays; etc. Many of the devices and methods of mounting these objects to roofs and walls of structures can require penetration of at least a portion of the roof assembly or a portion of a structural wall. As such, many of these devices and methods compromise the sealed envelope of the structure and can enable rain, snow, roof ponding water, wind, etc. to enter the structure or further deteriorate the structure surrounding the penetration points. Additionally, many attachment systems and devices present difficulty to installation teams due to weight, complexity of installation, movement of the attachment system to the roof level, etc.

Referring now to the drawings, FIG. 1 is a schematic view of a structure 100 having a mounting device 102 attached to a surface of a roof 104 of the structure 100. As shown, the mounting device 102 can attach or mount a device 106 to the structure 100. As previously discussed, the device 106 can include any number of objects or devices as desired. The remainder of this disclosure will describe the device 106 as a telecommunications device, however, this is not meant to be limiting.

Telecommunication devices are often located outdoors in order to provide wireless telecommunication access across a relatively wide area. In some examples, the telecommunications device 108 can be a fixed wireless access node (FWA), a repeater, a micro cell, a eNodeB, a gNodeB, etc. The telecommunications device 108 can be configured to transmit electronic data transmissions (schematically represented at 110) and receive electronic data transmissions (schematically represented at 112) from a main access point (or transmitter or antenna) 114. In some examples, the telecommunications device 108 can be a data connection node that provides primary broadband access through wireless, wide area, mobile network-enabled customer premises equipment (CPE) 116. The CPE 116 can include various form factors such as telephones, mobile devices, routers, modems, adapters for network services, network devices, etc. It is to be understood that a single FWA 108 can communicate with several CPE 116 devices (e.g., routers) to provide electronic communication modes such as mobile phone service, broadband internet access, etc. to multiple routers or end users within the structure 100.

Referring to FIG. 2, a perspective view of an example mounting device 102 is shown. The mounting device 102 includes a central shaft 200 extending along an axis 202 from a first end 204 to a second end 206. In some examples, the central shaft 200 has a cylindrical shape and can be constructed of any suitable material having material properties capable of withstanding an expected stress and strain value range for the mounting device 102. In other words, the material properties of the central shaft 200 are chosen and the central shaft 200 can be engineered to remain within a stress and strain value range such that a set of forces anticipated to act on the central shaft 200 during typical use result in deflection of the central shaft 200 only within the elastic deformation range of the material given the geometry of the central shaft 200. In some examples, the central shaft 200 can be a hollow cylinder or a structure similar to a hollow cylinder such as a tube or a pipe. In some examples, the first end 204 of the central shaft 200 or an area proximate the first end 204 of the central shaft 200 can define a threaded exterior surface portion 208. Any suitable thread type is acceptable for use with this disclosure.

The mounting device 102 further includes a first collar 210 located at a first position 212. Similar to the central shaft 200, the first collar 210 can have a cylindrical exterior shape and can be constructed of any suitable material. The first collar 210 can define a central aperture 214 such that the first collar 210 has an annular shape. In some examples, the first collar 210 includes a threaded interior surface configured to cooperate or engage with the threaded exterior surface portion 208 of the central shaft 200. The cooperation of the threaded interior surface of the first collar 210 and the threaded exterior surface portion 208 of the central shaft 200 serves to mount the first collar 210 to the central shaft 200. Because of the cooperation of the threaded interior surface of the first collar 210 and the threaded exterior surface portion 208 of the central shaft 200, the first collar 210 can be said to be movably mounted to the central shaft 200.

Remaining with FIG. 2, the mounting device 102 includes a second collar 216 mounted to the central shaft 200. The second collar 216 can be constructed of any suitable material and the second collar 216 can have an annular shape defining a central aperture 218. The central aperture 218 can be configured to cooperate with an exterior surface 220 of the central shaft 200 while allowing at least some relative motion between the central shaft 200 and the second collar 216. For example, a rotational motion (as represented by arrow 222) of the central shaft 200, can occur without urging a rotational motion of the second collar 216. In other words, in some examples, the central shaft 200 can freely rotate relative to the second collar 216. The described rotational motion of the central shaft 200 can be about the axis 202. It is also to be appreciated that axial motion (as represented by arrow 224) of the second collar 216 relative to the central shaft 200 can be limited. In some examples, it can be beneficial to limit the upward axial motion of the second collar 216 as will be described below.

The mounting device 102 further includes a linkage 226 extending from a first portion 228 to a second portion 230. The first portion 228 of the linkage 226 can be attached to the first collar 210, and the second portion 230 of the linkage 226 can be attached to the second collar 216. Any suitable attachment structures and methods to attach the first portion 228 to the first collar 210 and the second portion 230 to the second collar 216 are acceptable. As shown, one example attachment structure can be a pinned connection utilizing a pin 232. The pin 232 enables the first portion 228 to rotate about an axis of the pin 232 relative to the first collar 210. Similarly, the pin 232 enables the second portion 230 to rotate about an axis of the pin 232 relative to the second collar 216.

The linkage 226 has an inflection point 234 located between the first portion 228 and the second portion 230. As shown, the first portion 228 can extend generally upward and away from the first collar 210 and the central shaft 200. Similarly, the second portion 230 can extend generally downward and away from the second collar 216 and the central shaft 200. Each of the first portion 228 and the second portion 230 extend toward the inflection point 234 where the first portion 228 meets the second portion 230. In some examples, the first portion 228 can be movably attached to the second portion 230 such that at least one of the first portion 228 or the second portion 230 can rotate relative to at least one of the second portion 230 or the first portion 228.

In summary, the linkage 226 includes the first portion 228 extending away from the first collar 210 and the central shaft 200 to the inflection point 234 where the linkage 226 then turns and extends toward the second collar 216 and the central shaft 200. Similarly, one may describe the linkage 226 beginning at the opposite end as follows: the linkage 226 includes the second portion 230 extending away from the second collar 216 and the central shaft 200 to the inflection point 234 where the linkage 226 then turns and extends toward the first collar 210 and the central shaft 200. The linkage 226 can include a pinned connection, a living hinge, a hinged connection or any number of other suitable structures at the inflection point 234 such that the linkage 226 includes at least one portion extending away from the central shaft 200 at a first location to the inflection point 234 and at least one portion extending away from the central shaft 200 at a second location to the inflection point 234. The linkage 226 can include any number of components to develop the described configuration including a unitary member formed by the first portion 228 and the second portion 230.

In some examples, the linkage 226 includes a first link 236 attached to the first collar 210. The first link 236 can be attached to the first collar 210 with the previously described pinned connection utilizing the pin 232. The pin 232 enables the first link 236 to rotate, swivel, pivot, flex, etc. about the axis of the pin 232 relative to the first collar 210. As shown, the first link 236 extends generally upward and away from the first collar 210 and the central shaft 200. Similarly, the linkage 226 includes a second link 238 attached to the second collar 216. The second link 238 can be attached to the second collar 216 utilizing the pin 232 enabling the second link 238 to rotate, swivel, pivot, flex, etc. about the axis of the pin 232 relative to the second collar 216. Both the first link 236 and the second link 238 can be rigid force members.

The second link 238 can be attached to the first link 236 at a link joint 240 located at the inflection point 234. In some examples, the first link 236 can be attached to the second link 238 with the pinned connection utilizing the pin 232. The pin 232 enables the first link 236 to rotate, swivel, pivot, flex, etc. about the axis of the pin 232 relative to the second link 238. It is to be understood that the pin 232 is only one example attachment structure, and other attachment structures and methods are anticipated.

The mounting device 102 can include a foot pad 242 attached to the linkage 226 at the inflection point 234 or proximate the inflection point 234. The foot pad 242 can be configured to cooperate with another surface that will be described below. In some examples, the foot pad 242 can be attached to the first link 236 and the second link 238 at the link joint 240. The foot pad 242 can be movably attached (e.g., rotatably attached) to the first link 236 and the second link 238 utilizing the pin 232 enabling the foot pad 242 to rotate, swivel, pivot, flex, etc. as represented by arrow 244. This movable attachment enables the foot pad 242 to accommodate at least one of irregularities or out-of-square surface features presented by the surface that will be described below.

In some examples, the foot pad 242 includes an elastomeric material that can include a polymer compound, a rubber compound, a plastic, etc. The foot pad 242 can also be electrically non-conductive such that an electrical current, charge, signal, etc. cannot be passed from the mounting device 102 to another object in contact with the mounting device 102 such as the surface that will be described below.

In some examples, the first collar 210 can be movable relative to the central shaft 200. The first collar 210 can be movable due to both the threaded engagement of the threaded interior surface of the first collar 210 with the threaded exterior surface portion 208 of the central shaft 200 and also the inflection of the linkage 226 about the inflection point 234. FIG. 2 shows the first collar 210 located in a first position 246 located a first axial distance 248 from the first end 204. As shown, the first axial distance 248 can be measured between a top surface 250 of the first collar 210 and the first end 204 of the central shaft 200. However, the first axial distance 248 can be measured between any part of the first collar 210 and any portion of the central shaft 200. It is to be noted that FIG. 2 illustrates the first end 204 as being visible below the first collar 210 when the first collar 210 is located in the first position 246. In some examples, the first end 204 may not extend through the central aperture 214 of the first collar 210.

Additionally, when the first collar 210 is located in the first position 246, the first collar 210 can be located an axial distance 252 from the second collar 216. In some examples, the axial distance 252 can be measured between the top surface 250 of the first collar 210 and a bottom surface 254 of the second collar 216.

When the first collar 210 is located in the first position 246, the foot pad 242 can be located a first radial distance 256 from the axis 202. In some examples, there are multiple linkages 226, and two foot pads 242 can be diametrically opposed one another such that the two foot pads 242 include outward facing surfaces that are located at a diameter 258. In some examples, the diameter 258 can be approximately equal to an inside diameter of a standard tube or standard pipe. For the purposes of this disclosure, the term approximately equal can mean within one-inch. The term approximately equal can, in other examples, mean within ½-inch. Further examples of the mounting device 102 can include various numbers of linkages 226 as desired.

Figure 3:
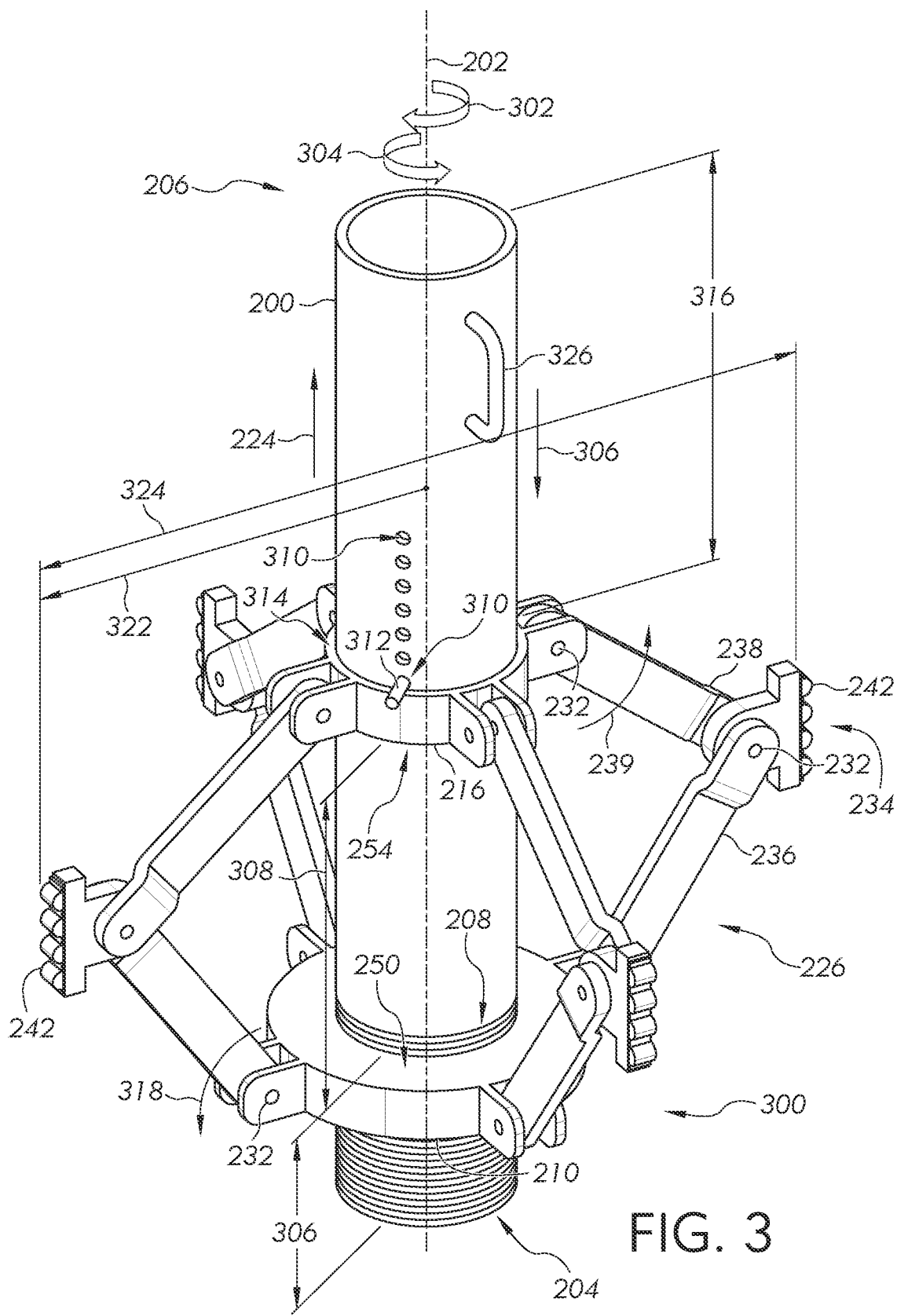
FIG. 3 is similar to FIG. 2 showing the first collar located at a second position.

Referring now to FIG. 3, a perspective view of the mounting device 102 is shown with the first collar 210 located in a second position 300. As previously discussed, the first collar 210 can be movably mounted to the central shaft 200 through engagement of the threaded interior surface of the first collar 210 with the threaded exterior surface portion 208 of the central shaft 200. Rotation of the central shaft 200 about the axis 202 as represented by arrow 302 will move the first collar 210 between the first position 246 (shown in FIG. 2) and the second position 300. For example, if the threaded interior surface of the first collar 210 and the threaded exterior surface portion 208 of the central shaft 200 are "right-hand" threaded, then clockwise rotation (represented by arrow 302) of the central shaft 200 will urge the first collar 210 in a direction (represented by arrow 224) along the axis 202 from the first position 246 to the second position 300. For example, the clockwise rotation of the central shaft 200 will urge the first collar 210 generally upward in FIGS. 2 and 3. In some examples, this direction 224 can be parallel to the axis 202. In some examples, the direction 224 can be generally parallel to the axis 202 or within 5° of axis 202.

As shown in FIG. 3, the first collar 210 can be selectively moved to the second position 300 located a second axial distance 306 from the first end 204. As shown, the second axial distance 306 can be measured between the top surface 250 of the first collar 210 and the first end 204 of the central shaft 200. However, the second axial distance 306 can be measured between any part of the first collar 210 and any portion of the central shaft 200.

It is to be appreciated that the first axial distance 248 can be different than the second axial distance 306. For example, in the described examples when the central shaft 200 is rotated in the clockwise direction 302, the first axial distance 248 can be less than the second axial distance 306, as the first collar 210 has moved toward the second collar 216 (e.g., generally toward the top of the figure in FIGS. 2 and 3).

However, counterclockwise rotation (represented by arrow 304) of the central shaft 200 will urge the first collar 210 in a direction (represented by arrow 306) along the axis 202 from the second position 300 toward the first position 246. With counterclockwise rotation, the first axial distance can be the distance 306 and can be greater than the second axial distance which can be the distance 248 (shown in FIG. 2). Rotation in the counterclockwise direction 304 urges the first collar 210 away from the second collar 216 (e.g., generally toward the bottom of the figure in FIGS. 2 and 3). In some examples, this direction 306 can be parallel to the axis 202. In some examples, the direction 306 can be generally parallel to the axis 202, or within 5° of axis 202.

Additionally, when the first collar 210 is located in the second position 300, it can be located an axial distance 308 from the second collar 216. In some examples, the axial distance 308 can be measured between the top surface 250 of the first collar 210 and a bottom surface 254 of the second collar 216. When the first collar 210 is located in the second position 300 as shown in FIG. 3, the axial distance 308 can be less than the axial distance 252 of FIG. 2 when the first collar 210 is located in the first position 246.

To this point, the disclosure has discussed right-hand threads formed into the threaded exterior surface portion 208 of the central shaft 200 at the first end 204 or proximate the first end 204. As discussed, the right-hand threads of the threaded exterior surface portion 208 cooperate with the similarly right-hand threaded interior surface of the first collar 210. It is to be understood that if the discussed threaded surfaces instead define left-hand threads, the previously described rotations and motions of collars 210, 216 will be reversed.

Remaining with FIG. 3, in some examples, the central shaft 200 defines an aperture 310. The aperture 310 can be configured to cooperate with a pin 312 such that the pin 312 provides a physical interference with some movement of the second collar 216 along the axial direction 224. As previously discussed, rotation of the central shaft 200 about the axis 202 as represented by arrow 302 will move the first collar 210 from the first position 246 (shown in FIG. 2) toward the second position 300. After a sufficient number of turns or rotations of the central shaft 200, the first collar 210 is moved to the second position 300 as shown in FIG. 3. It is to be understood that the movement of the first collar 210 in the axial direction 224 (e.g., upward) can urge movement of the linkage 226 in the same axial direction 224. Similarly, movement of the linkage 226 in the axial direction 224 can urge the second collar 216 to move in the same axial direction 224.

The pin 312 can serve to positively locate the second collar 216 in the axial direction 224. As the second collar 216 is moved to the location shown in FIG. 3, a top surface 314 of the second collar 216 comes into contact with the pin 312. While located in the aperture 310, the pin 312 is unable to move in the axial direction 224 and thus provides a physical interference to limit movement of the second collar 216 in the axial direction 224. The pin 312 can be used to maintain a minimum separation distance 316 between the second collar 216 and the second end 206 of the central shaft 200. In some examples, the central shaft 200 can define multiple apertures 310. Moreover, at least one aperture 310 can be defined to pass through a full diameter of the central shaft 200 such that a first end of the pin 312 and a second end of the pin 312 can each extend through and away from an outside surface of the central shaft 200.

After the top surface 314 of the second collar 216 comes into contact with the pin 312, further movement of the first collar 210 in the axial direction 224 (e.g., upward) will urge flexion or rotation of the linkage 226. In the shown example of FIG. 3, the first link 236 will be urged to rotate about the axis of pin 232 where the first link 236 can be connected to the first collar 210. Rotation of the first link 236 will be according to arrow 318. Similarly, the second link 238 will be urged to rotate about the axis of the pin 232 that connects the second link 238 to the second collar 216. Rotation of the second link 238 will be according to arrow 320. The pin 232 at the inflection point 234 enables the first link 236 and the second link 238 to be connected while rotating in opposing directions.

As the central shaft 200 is rotated in the clockwise direction 302, the first collar 210 is moved from the first position 246 (shown in FIG. 2) to the second position 300 (shown in FIG. 3) toward the second collar 216 such that the axial distance 252 (shown in FIG. 2) between the first collar 210 and the second collar 216 can be reduced to the axial distance 308 (shown in FIG. 3). As noted, this movement of the first collar 210, with the second collar 216 restrained from axial movement in direction 224 by the pin 312, the linkage 226 can be urged to flex or rotate as described above. This flexion or rotation of the linkage 226 urges the inflection point 234 and the foot pad 242 from the first radial distance 256 (shown in FIG. 2) to the second radial distance 322 (shown in FIG. 3). The first radial distance 256 can be different from the second radial distance 322, and in this example of the first collar 210 moving from the first position 212 to the second position 300, the second radial distance 322 can be greater than the first radial distance 256.

As noted previously, in some examples, the mounting device 102 can include multiple linkages 226, and multiple foot pads 242 can be diametrically opposed one another such that the foot pads 242 include outward facing surfaces that are located at a diameter 324 when the first collar 210 is located in the first position 246. In some examples, the multiple linkages 226 are spaced equally around a circumference of the central shaft 200. In some examples, the diameter 324 can be greater than an inside diameter of an object (e.g., a standard tube or a standard pipe).

In some examples, the mounting device 102 can include a handle 326 or other suitable device attached to the central shaft 200. The handle 326 can be configured to ease rotation of the central shaft 200 during an installation or a removal operation of the mounting device 102. For example, the handle 326 can provide an installer or operator a relatively convenient structure to manipulate the central shaft 200 during a rotation maneuver during an installation or removal operation. The handle 326 can provide more leverage for rotation of the central shaft 200 and can provide a handling device during movement of the mounting device 102. Of course, other structures or defined structures such as a cut-out area or a burn-out defined by the central shaft 200 are acceptable to use as the handle 326 with the present disclosure.

In some examples, the mounting device 102 includes a structure configured to limit a rotational motion of the first collar 210 during a rotational motion (shown as arrows 302, 304) of the central shaft 200. During desired operator rotation of the central shaft 200, it may be desirable to limit rotation of the first collar 210 relative to the central shaft 200 such that rotation of the central shaft 200 urges movement of the first collar 210 in at least one of the axial directions 224, 306. In some examples, at least some of the linkage 226 can serve as the structure configured to limit rotational motion of the first collar 210. For example, an operator of the mounting device 102 can have one hand gripping the handle 326 while holding a portion of the linkage 226 to urge rotation of the central shaft 200 relative to the first collar 210.

Figure 4:
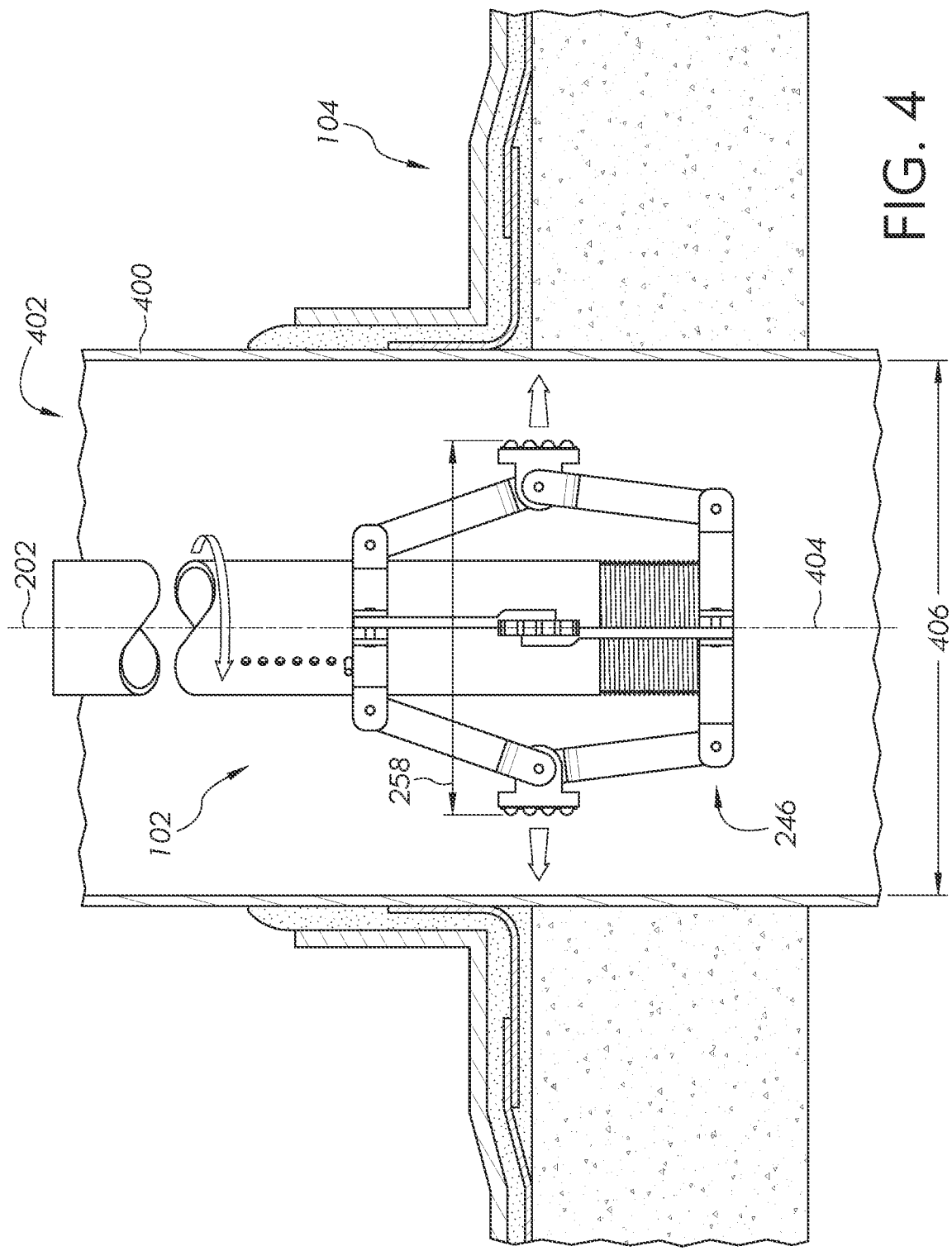
FIG. 4 illustrates the mounting device within an object, the first collar located at the first position.

Referring to FIG. 4, the mounting device 102 is illustrated within an object 400 while the first collar 210 is located at the first position 246. In some examples, the structure 100 as shown in FIG. 1 can be a habitable or occupied building of nearly any type. In such structures 100, the Uniform Plumbing Code (UPC) requires each plumbing fixture trap (e.g., sink, toilet, shower) to be vented by means of vent pipes. The remainder of the disclosure will discuss the object 400 as the vent pipe, however, other objects or structures can be suitable for use with the apparatus and methods described. In many examples, the vent pipe 400 extends through the roof 104 to provide vent air and/or atmospheric pressure to portions of plumbing runs within the interior of the structure 100. The roof 104 can include any number of suitable roofing assemblies including, but not limited to, the shown membrane roof assembly, modified bitumen roofs, ballasted roofs, etc.

During an installation process, the mounting device 102 can be placed into the vent pipe 400 through the opening 402 defined by an exposed end of the vent pipe 400 above the roof 104. In some examples, the axis 202 of the mounting device 102 can be parallel to an axis 404 of the vent pipe 400. In some examples, the axis 202 of the mounting device 102 can be colinear with the axis 404 of the vent pipe 400.

As shown, the diameter 258 between outward facing surfaces of the foot pads 242 can be less than a diameter 406 of the vent pipe 400 such that the mounting device 102 can be relatively easily inserted within the inside diameter 406 of the vent pipe 400. In some examples, an upper portion 408 of the mounting device 102 will remain exposed outside of the vent pipe 400 in order to mount the device 106 onto the central shaft 200.

Figure 5:
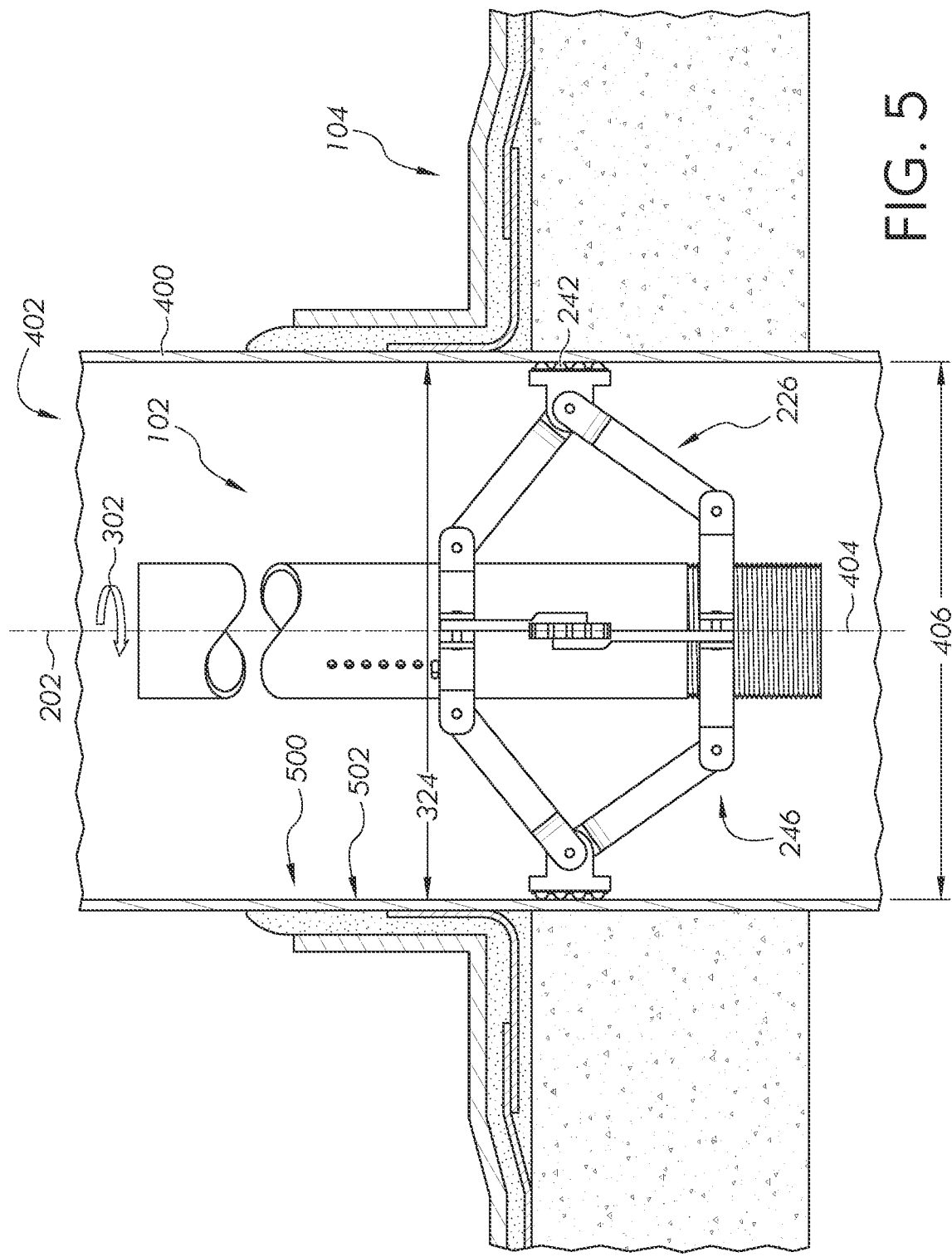
FIG. 5 is similar to FIG. 4 showing the first collar located at the second position.

Referring to FIG. 5, the mounting device 102 is illustrated within the object (e.g., vent pipe 400) while the first collar 210 is located at the second position 300. As described previously, clockwise rotation of the central shaft 200 about the axis 202 according to arrow 302 urges the first collar 210 from the first position 246 to the second position 300 and increases the diameter 258 of the foot pads 242 to the diameter 324. The diameter 324 can be equal to the inside diameter 406 of the vent pipe 400. In some examples, it may be beneficial to engineer and manufacture the linkage 226 such that the diameter 324 can be greater than the inside diameter 406 of the vent pipe 400, if the inside diameter 406 did not otherwise limit the diameter 324. With this arrangement, the elastomeric material of the foot pads 242 can compress against an interior surface 500 of the vent pipe 400 to enable greater stability of the mounting device 102 when it is mounted within the vent pipe 400. Some elements such as the first link 236 and the second link 238 can be elastically deformed (e.g., compressed) when the first collar 210 is located in the second position 300 and the foot pads 242 are applying force against the interior surface 500 of the vent pipe 400. At least one of the compression of the foot pads 242 or the elastic deformation of the first and second links 236, 238 can provide a relatively constant pre-load force transverse to the axis 404.

To briefly summarize, movement of the first collar 210 from the first position 246 to the second position 300 urges the foot pad 242 to contact the interior surface 500 of the object (e.g., vent pipe 400) into which the mounting device 102 can be placed. Radial expansion of the linkage 226 and contact between the foot pad 242 and the interior surface 500 creates a force (represented by arrow 502) oriented transverse to the axis 404 to secure the mounting device 102 within the object 400. In some examples, the force 502 can be directed radially away from the axis 404 and can be perpendicular to the axis 404. It is to be understood that the force 502 can be applied by each foot pad 242 against the interior surface 500. In some examples, the force 502 applied by any foot pad 242 may vary from the force 502 applied by another foot pad 242 due to manufacturing tolerances or other factors. Unless and until the central shaft 200 is rotated in a counterclockwise direction, the force 502 will remain acting between the foot pads 242 and the interior surface 500 to provide a relatively strong mounting base for the mounting device 102 to withstand reasonably expected weather elements, wind forces, accidental impacts, etc. in order to mount the device 106 to the structure 100.

Figure 6:
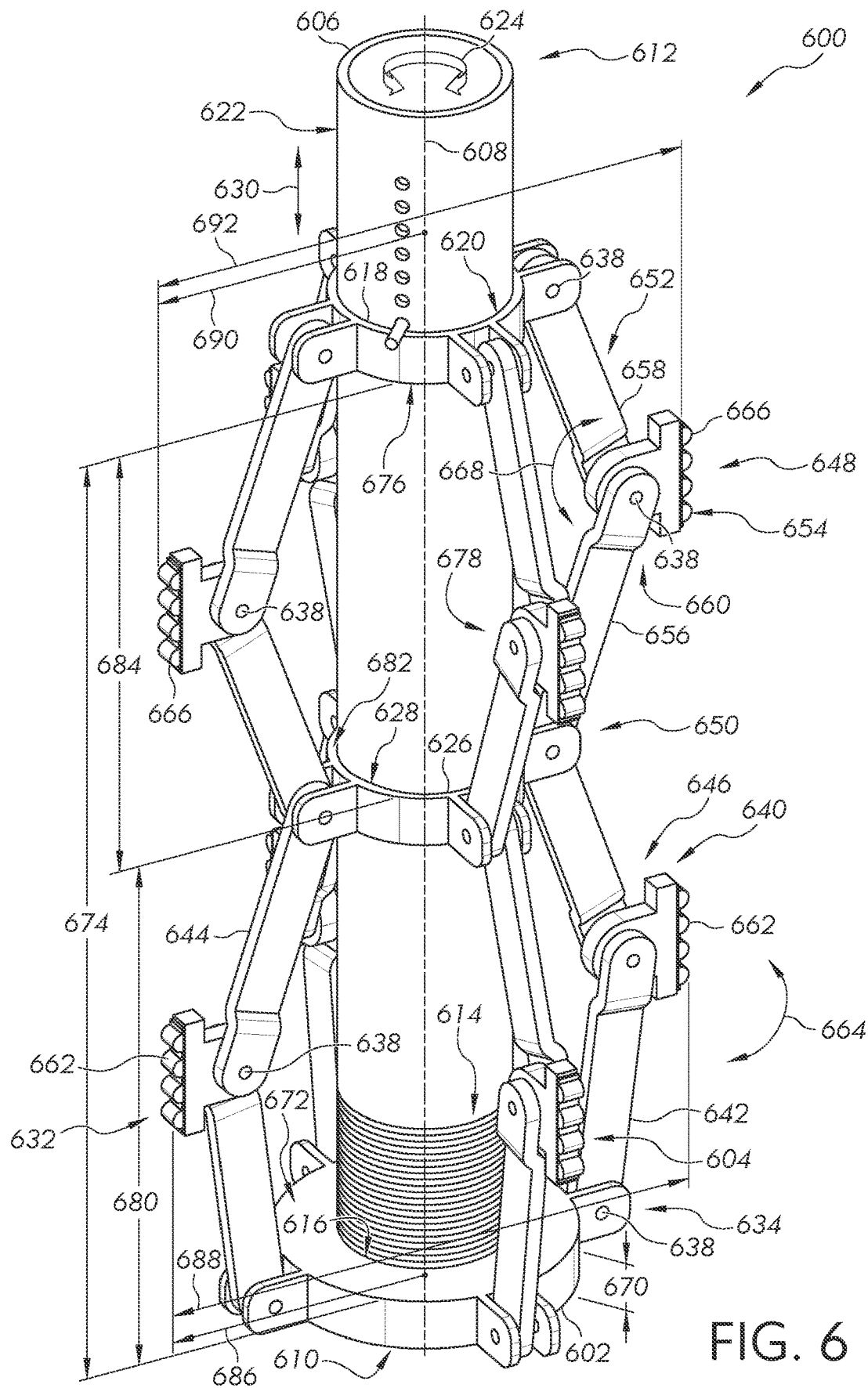
FIG. 6 is a perspective view of an example mounting device having a first collar located at a first position.

Referring to FIG. 6, is a perspective view of an example mounting device 600 having a first collar 602 located at a first position 604 is illustrated. As with the previous example, the mounting device 600 includes a central shaft 606 extending along an axis 608 from a first end 610 to a second end 612. In nearly all respects, the description of the central shaft 200 shown in FIG. 2 also pertains to the central shaft 606. In some examples, the first end 610 of the central shaft 606 or an area proximate the first end 610 of the central shaft 606 can define a threaded exterior surface portion 614. Any suitable thread type is acceptable for use with this disclosure.

Similar to the previous example, the first collar 602 can have a cylindrical exterior shape and can be constructed of any suitable material. The first collar 602 can define a central aperture 616 such that the first collar 602 has an annular shape. In some examples, the first collar 602 includes a threaded interior surface configured to cooperate or engage with the threaded exterior surface portion 614 of the central shaft 606. The cooperation of the threaded interior surface of the first collar 602 and the threaded exterior surface portion 614 of the central shaft 606 serves to mount the first collar 602 to the central shaft 606. Because of the cooperation of the threaded interior surface of the first collar 602 and the threaded exterior surface portion 614 of the central shaft 606, the first collar 602 can be said to be movably mounted to the central shaft 606.

The mounting device 600 includes a second collar 618 mounted to the central shaft 606. The second collar 618 can be constructed of any suitable material and the second collar 618 can have an annular shape defining a central aperture 620. The central aperture 620 can be configured to cooperate with an exterior surface 622 of the central shaft 606 while allowing at least some relative motion between the central shaft 606 and the second collar 618. For example, a rotational motion (as represented by arrow 624) of the central shaft 606, can occur without urging a rotational motion of the second collar 618. In other words, in some examples, the central shaft 606 can freely rotate relative to the second collar 618. The described rotational motion of the central shaft 606 can be about the axis 608.

The mounting device 600 includes a third collar 626 mounted to the central shaft 606. The third collar 626 can be located between the first collar 602 and the second collar 618. The third collar 626 can be constructed of any suitable material and the third collar 626 can have an annular shape defining a central aperture 628. The central aperture 628 can be configured to cooperate with the exterior surface 622 of the central shaft 606 while allowing at least some relative motion between the central shaft 606 and the third collar 626. For example, a rotational motion (as represented by arrow 624) of the central shaft 606, can occur without urging a rotational motion of the third collar 626. In other words, in some examples, the central shaft 606 can freely rotate relative to the third collar 626. The described rotational motion of the central shaft 606 can be about the axis 608. It is also to be appreciated that axial motion (as represented by arrow 630) of the third collar 626 relative to the central shaft 606 can be limited. In some examples, it can be beneficial to limit the upward axial motion of the third collar 626 as will be described below.

Remaining with FIG. 6, the mounting device 600 includes a first linkage 632 extending from a first portion 634 to a second portion 636. The first portion 634 of the first linkage 632 can be attached to the first collar 602, and the second portion 636 of the first linkage 632 can be attached to the third collar 626. Any suitable attachment structures and methods to attach the first portion 634 to the first collar 602 and the second portion 636 to the third collar 626 are acceptable. As shown, one example attachment structure can be a pinned connection utilizing a pin 638. The pin 638 enables the first portion 634 to rotate about an axis of the pin 638 relative to the first collar 602. Similarly, the pin 638 enables the second portion 636 to rotate about an axis of the pin 638 relative to the third collar 626.

The first linkage 632 has a first inflection point 640 located between the first portion 634 and the second portion 636. As shown, the first portion 634 can extend generally upward and away from the first collar 602 and the central shaft 606. Similarly, the second portion 636 can extend generally downward and away from the third collar 626 and the central shaft 606. Each of the first portion 634 and the second portion 636 extend toward the first inflection point 640 where the first portion 634 meets the second portion 636. In some examples, the first portion 634 can be movably attached to the second portion 636 such that at least one of the first portion 634 or the second portion 636 can rotate relative to at least one of the second portion 636 or the first portion 634.

The first linkage 632 can include any number of components to develop the described configuration including a unitary member formed by the first portion 634 and the second portion 636. In some examples, the first linkage 632 includes a first link 642 attached to the first collar 602. The first link 642 can be attached to the first collar 602 with the previously described pinned connection utilizing the pin 638. The pin 638 enables the first link 642 to rotate, swivel, pivot, flex, etc. about the axis of the pin 638 relative to the first collar 602. As shown, the first link 642 extends generally upward and away from the first collar 602 and the central shaft 606. Similarly, the first linkage 632 includes a second link 644 attached to the third collar 626. The second link 644 can be attached to the third collar 626 utilizing the pin 638 enabling the second link 644 to rotate, swivel, pivot, flex, etc. about the axis of the pin 638 relative to the third collar 626. Both the first link 642 and the second link 644 can be rigid force members.

The second link 644 can be attached to the first link 642 at a link joint 646 located at the first inflection point 640. In some examples, the first link 642 can be attached to the second link 644 with the pinned connection utilizing the pin 638. The pin 638 enables the first link 642 to rotate, swivel, pivot, flex, etc. about the axis of the pin 638 relative to the second link 644. It is to be understood that the pin 638 is only one example attachment structure, and other attachment structures and methods are anticipated. The first linkage 632 can include any number of components to develop the described configuration including a unitary member formed by the first portion 634 and the second portion 636.

As shown, the mounting device 600 includes a second linkage 648 extending from a first portion 650 to a second portion 652. The first portion 650 of the second linkage 648 can be attached to the third collar 626, and the second portion 652 of the second linkage 648 can be attached to the second collar 618. Any suitable attachment structures and methods to attach the first portion 650 to the third collar 626 and the second portion 652 to the second collar 618 are acceptable. As shown, one example attachment structure can be a pinned connection utilizing a pin 638. The pin 638 enables the first portion 650 to rotate about an axis of the pin 638 relative to the third collar 626. Similarly, the pin 638 enables the second portion 636 to rotate about an axis of the pin 638 relative to the second collar 618.

The second linkage 648 includes a second inflection point 654 located between the second portion 652 and the first portion 650 of the second linkage 648. As shown, the first portion 650 can extend generally upward and away from the third collar 626 and the central shaft 606. Similarly, the second portion 652 can extend generally downward and away from the second collar 618 and the central shaft 606. Each of the first portion 650 and the second portion 652 extend toward the second inflection point 654 where the first portion 650 meets the second portion 652. In some examples, the first portion 650 can be movably attached to the second portion 652 such that at least one of the first portion 650 or the second portion 652 can rotate relative to at least one of the second portion 652 or the first portion 650.

The second linkage 648 can include any number of components to develop the described configuration including a unitary member formed by the first portion 650 and the second portion 652. In some examples, the second linkage 648 includes a first link 656 attached to the first collar 602. The first link 656 can be attached to the third collar 626 with the previously described pinned connection utilizing the pin 638. The pin 638 enables the first link 656 to rotate, swivel, pivot, flex, etc. about the axis of the pin 638 relative to the third collar 626. As shown, the first link 656 extends generally upward and away from the third collar 626 and the central shaft 606. Similarly, the second linkage 648 includes a second link 658 attached to the second collar 618. The second link 658 can be attached to the second collar 618 utilizing the pin 638 enabling the second link 658 to rotate, swivel, pivot, flex, etc. about the axis of the pin 638 relative to the second collar 618. Both the first link 656 and the second link 658 can be rigid force members.

The second link 658 can be attached to the first link 656 at a link joint 660 located at the second inflection point 654. In some examples, the first link 656 can be attached to the second link 658 with the pinned connection utilizing the pin 638. The pin 638 enables the first link 656 to rotate, swivel, pivot, flex, etc. about the axis of the pin 638 relative to the second link 658. It is to be understood that the pin 638 is only one example attachment structure, and other attachment structures and methods are anticipated. The second linkage 648 can include any number of components to develop the described configuration including a unitary member formed by the first portion 650 and the second portion 652.

The mounting device 600 includes a first foot pad 662 attached to the first linkage 632 at the first inflection point 640 or proximate the first inflection point 640. The first foot pad 662 can be configured to cooperate with another surface that will be described below. In some examples, the first foot pad 662 can be attached to the first link 642 and the second link 644 at the link joint 646. The first foot pad 662 can be movably attached (e.g., rotatably attached) to the first link 642 and the second link 644 utilizing the pin 638 enabling the first foot pad 662 to rotate, swivel, pivot, flex, etc. as represented by arrow 664.

The mounting device 600 includes a second foot pad 666 attached to the second linkage 648 at the second inflection point 654 or proximate the second inflection point 654. The second foot pad 666 can be configured to cooperate with another surface that will be described below. In some examples, the second foot pad 666 can be attached to the first link 656 and the second link 658 at the link joint 660. The second foot pad 666 can be movably attached (e.g., rotatably attached) to the first link 656 and the second link 658 utilizing the pin 638 enabling the second foot pad 666 to rotate, swivel, pivot, flex, etc. as represented by arrow 668. This movable attachment enables the first foot pad 662 and the second foot pad 666 to accommodate at least one of irregularities or out-of-square surface features presented by the surface that will be described below.

In some examples, the first foot pad 662 and the second foot pad 666 include an elastomeric material that can include a polymer compound, a rubber compound, a plastic, etc. The first foot pad 662 and the second foot pad 666 can also be electrically non-conductive such that an electrical current, charge, signal, etc. cannot be passed from the mounting device 600 to another object in contact with the mounting device 600 such as the surface that will be described below.

Similar to previously described examples, the first collar 602 can be movable relative to the central shaft 606. The first collar 602 can be movable due to both the threaded engagement of the threaded interior surface of the first collar 602 with the threaded exterior surface portion 614 of the central shaft 606, the inflection of the first linkage 632 about the first inflection point 640, and the inflection of the second linkage 648 about the second inflection point 654. FIG. 6 shows the first collar 602 located in a first position 604 located a first axial distance 670 from the first end 610. As shown, the first axial distance 670 can be measured between a top surface 672 of the first collar 602 and the first end 610 of the central shaft 606. However, the first axial distance 670 can be measured between any part of the first collar 602 and any portion of the central shaft 606. It is to be noted that FIG. 6 illustrates the first end 610 as being visible below the first collar 602 (e.g., extending past the first collar 602) when the first collar 602 is located in the first position 604. In some examples, the first end 610 may not extend through the central aperture 616 of the first collar 602 such that the first end 610 extends away from a bottom surface of the first collar 602.

Additionally, when the first collar 602 is located in the first position 604, the first collar 602 can be located an axial distance 674 from the second collar 618. In some examples, the axial distance 674 can be measured between the top surface 672 of the first collar 602 and a bottom surface 676 of the second collar 618.

Remaining with FIG. 6, the third collar 626 can also be movable, due to at least one of inflection of the first linkage 632 about the first inflection point 640 or inflection of the second linkage 648 about the second inflection point 654. The third collar 626 can be movable from a third position 678 located a third axial distance 680 from the first end 610. As shown, the third axial distance 680 can be measured between a top surface 682 of the third collar 626 and the first end 610 of the central shaft 606. However, the third axial distance 680 can be measured between any part of the third collar 626 and any portion of the central shaft 606.

Additionally, when the third collar 626 is located in the third position 678, the third collar 626 can be located an axial distance 684 from the second collar 618. In some examples, the axial distance 684 can be measured between the top surface 682 of the third collar 626 and the bottom surface 708 of the second collar 618.

When the first collar 602 is located in the first position 604 and the third collar 626 is located in the third position 678, the first foot pad 662 can be located a first radial distance 686 from the axis 608. In some examples, there are multiple first linkages 632, and two first foot pads 662 can be diametrically opposed one another such that the two first foot pads 662 include outward facing surfaces that are located at a first diameter 688. In some examples, the first diameter 688 can be approximately equal to an inside diameter of a standard tube or standard pipe. For the purposes of this disclosure, the term approximately equal can mean within one-inch. The term approximately equal can, in other examples, mean within ½-inch.

Similarly, when the first collar 602 is located in the first position 604 and the third collar 626 is located in the third position 678, the second foot pad 666 can be located a second radial distance 690 from the axis 608. In some examples, there are multiple second linkages 648, and two second foot pads 666 can be diametrically opposed one another such that the two second foot pads 666 include outward facing surfaces that are located at a second diameter 692. In some examples, the second diameter 692 can be approximately equal to an inside diameter of a standard tube or standard pipe. For the purposes of this disclosure, the term approximately equal can mean within one-inch. The term approximately equal can, in other examples, mean within ½-inch. Further examples of the mounting device 600 can include various numbers of first linkages 632 and second linkages 648 as desired.

Figure 7:
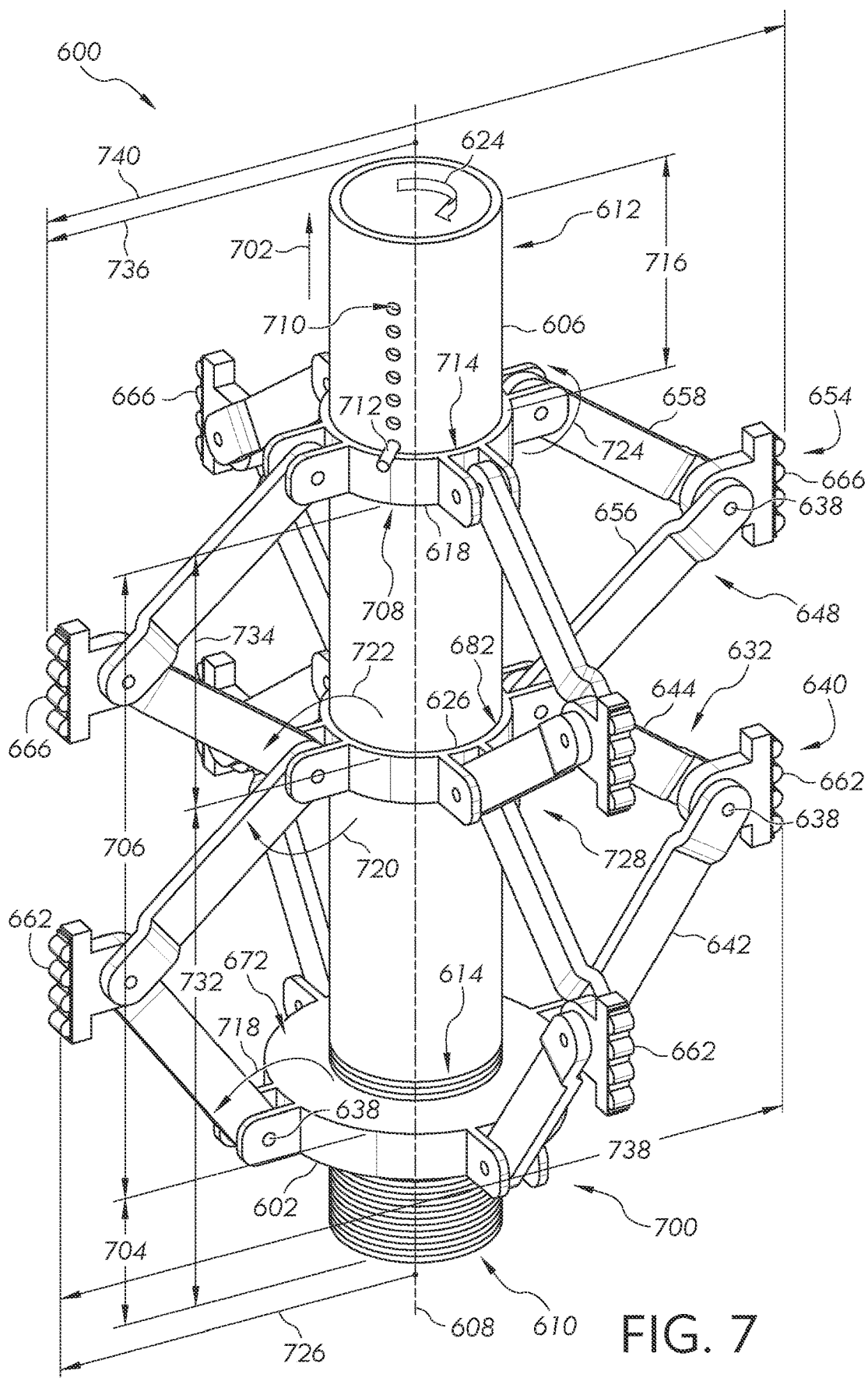
FIG. 7 is similar to FIG. 6 showing the first collar located at a second position.

Referring now to FIG. 7, the mounting device 600 is illustrated showing the first collar 602 located at a second position 700. Rotation of the central shaft 606 about the axis 608 as represented by arrow 624 will move the first collar 602 between the first position 604 (shown in FIG. 6) and the second position 700. For example, if the threaded interior surface of the first collar 602 and the threaded exterior surface portion 614 of the central shaft 606 are "right-hand" threaded, then clockwise rotation (represented by arrow 624) of the central shaft 606 will urge the first collar 602 in a direction (represented by arrow 702) along the axis 608 from the first position 604 to the second position 700. For example, the clockwise rotation of the central shaft 606 will move or urge the first collar 602 generally upward in FIGS. 6 and 7. In some examples, this direction 702 can be parallel to the axis 608. In some examples, the direction 702 can be generally parallel to the axis 608 or within 5° of axis 608.

As shown in FIG. 7, the first collar 602 can be selectively moved to the second position 700 located a second axial distance 704 from the first end 610. As shown, the second axial distance 704 can be measured between the top surface 672 of the first collar 602 and the first end 610 of the central shaft 606.

It is to be appreciated that the first axial distance 670 (shown in FIG. 6) can be different than the second axial distance 704 (shown in FIG. 7). For example, in the described examples, when the central shaft 606 is rotated in the clockwise direction 624, the first axial distance 670 can be less than the second axial distance 704, as the first collar 602 has moved toward the second collar 618 (e.g., generally toward the top of the figure in FIGS. 6 and 7).

Additionally, when the first collar 602 is located in the second position 700, it can be located an axial distance 706 from the second collar 618. In some examples, the axial distance 706 can be measured between the top surface 672 of the first collar 602 and a bottom surface 708 of the second collar 618. When the first collar 602 is located in the second position 700 as shown in FIG. 7, the axial distance 706 can be less than the axial distance 674 (shown in FIG. 6) when the first collar 602 is located in the first position 604.

In some examples, the central shaft 606 defines an aperture 710. The aperture 710 can be configured to cooperate with a pin 712 such that the pin 712 provides a physical interference with some movement of the second collar 618 along the axial direction 702. As previously discussed, rotation of the central shaft 606 about the axis 608 as represented by arrow 624 will move the first collar 602 from the first position 604 (shown in FIG. 6) toward the second position 700. After a sufficient number of turns or rotations of the central shaft 606, the first collar 602 is selectively moved to the second position 700 as shown in FIG. 7. It is to be understood that the movement of the first collar 602 in the axial direction 702 (e.g., upward) can urge movement of at least one of the first linkage 632 or the second linkage 648 in the same axial direction 702. Similarly, movement of the first linkage 632 or the second linkage 648 in the axial direction 702 can urge at least one of the third collar 626 or the second collar 618 to move in the same axial direction 702.

The pin 712 can serve to positively locate the second collar 618 in the axial direction 702. As the second collar 618 is moved to the location shown in FIG. 7, a top surface 714 of the second collar 618 comes into contact with the pin 712. While located in the aperture 710, the pin 712 is unable to move in the axial direction 702 and thus provides a physical interference to limit movement of the second collar 618 in the axial direction 702. The pin 712 can be used to maintain a minimum separation distance 716 between the second collar 618 and the second end 612 of the central shaft 606. In some examples, the central shaft 606 can define multiple apertures 710. Moreover, at least one aperture 710 can be defined to pass through a full diameter of the central shaft 606 such that a first end of the pin 712 and a second end of the pin 712 can each extend through and away from an outside surface of the central shaft 606.

After the top surface 714 of the second collar 618 comes into contact with the pin 712, further movement of the first collar 602 in the axial direction 702 (e.g., upward) will urge flexion or rotation of at least one of the first linkage 632 or the second linkage 648. It is to be understood that the flexion or rotation of the first linkage 632 and the second linkage 648 can be at the same or different rotational speeds.

In the shown example of FIG. 7, the first link 642 of the first linkage 632 will be urged to rotate about the axis of pin 638 where the first link 642 can be connected to the first collar 602. Rotation of the first link 642 will be according to arrow 718. Similarly, the second link 644 of the first linkage 632 will be urged to rotate about the axis of the pin 638 that connects the second link 644 to the third collar 626. Rotation of the second link 644 will be according to arrow 720. The pin 638 at the first inflection point 640 enables the first link 642 and the second link 644 to be connected to each other while rotating in opposing directions.

Similarly, the first link 656 of the second linkage 648 will be urged to rotate about the axis of pin 638 where the first link 656 can be connected to the third collar 626. Rotation of the first link 656 will be according to arrow 722. The second link 658 of the second linkage 648 will be urged to rotate about the axis of the pin 638 that connects the second link 658 to the second collar 618. Rotation of the second link 658 will be according to arrow 724. The pin 638 at the second inflection point 654 enables the first link 656 and the second link 658 to be connected to each other while rotating in opposing directions.

Remaining with FIG. 7, as the central shaft 606 is rotated in the clockwise direction 624, the first collar 602 can be selectively moved from the first position 604 (shown in FIG. 6) to the second position 700 (shown in FIG. 7) toward the second collar 618 such that the axial distance 674 (shown in FIG. 6) between the first collar 602 and the second collar 618 can be reduced to the axial distance 706 (shown in FIG. 7). As noted, this movement of the first collar 602, with the second collar 618 restrained from axial movement in direction 702 by the pin 712, the first linkage 632 can be urged to flex or rotate as described above. This flexion or rotation of the first linkage 632 urges the first inflection point 640 and the first foot pad 662 from the first radial distance 686 (shown in FIG. 6) to the third radial distance 726 (shown in FIG. 7). The third radial distance 726 can be different than the first radial distance 686, and in this example of the first collar 602 moving from the first position 604 to the second position 700, the third radial distance 726 can be greater than the first radial distance 686.

Similarly, as the central shaft 606 is rotated in the clockwise direction 624, the third collar 626 can be moved from the third position 678 (shown in FIG. 6) to a fourth position 728 (shown in FIG. 7). When in the fourth position 728, the third collar 626 can be located a fourth axial distance 732 from the first end 610. As shown, the fourth axial distance 732 can be measured between the top surface 682 of the third collar 626 and the first end 610 of the central shaft 606.

It is to be appreciated that the third axial distance 680 (shown in FIG. 6) can be different than the fourth axial distance 732 (shown in FIG. 7). For example, in the described examples, when the central shaft 606 is rotated in the clockwise direction 624, the third axial distance 680 can be less than the fourth axial distance 732, as the third collar 626 has moved toward the second collar 618 (e.g., generally toward the top of the figure in FIGS. 6 and 7).

As a brief summary, the first collar 602 can be located at the first position 604 at the first axial distance 670 (shown in FIG. 6) from the first end 610. The first collar 602 can be selectively moved from the first position 604 to the second position 700 at the second axial distance 704 (shown in FIG. 7) from the first end 610. The first collar 602 can also be moved to any of an infinite number of points between the first position 604 and the second position 700. Movement of the first collar 602 urges the third collar 626 from the third position 678 at the third axial distance 680 (shown in FIG. 6) from the first end 610. The third collar 626 can be moved to the fourth position 728 at the fourth axial distance 732 (shown in FIG. 7) from the first end 610. The third collar 626 can also be moved to any of an infinite number of points between the third position 678 and the fourth position 728.

In some examples, the first collar 602 distance of travel urges the third collar 626 to travel a different distance than the first collar 602. In some particular examples, a first difference between the first axial distance 670 and the second axial distance 704 can be greater than a second difference between the third axial distance 680 and the fourth axial distance 732. Where the first difference is greater than the second difference, the first collar 602 moves a greater distance than the third collar 626 moves. In some further examples, the distance of travel of the first collar 602 movement can be twice the distance of travel of the third collar 626 (e.g., the first difference can be double the second difference).

Additionally, when the third collar 626 is located in the fourth position 728, the third collar 626 can be located an axial distance 734 from the second collar 618. In some examples, the axial distance 734 can be measured between the top surface 682 of the third collar 626 and the bottom surface 708 of the second collar 618. When the third collar 626 is located in the fourth position 728 as shown in FIG. 7, the axial distance 734 can be less than the axial distance 684 (shown in FIG. 6) when the third collar 626 is located in the third position 678.

As noted, this movement of the third collar 626, with the second collar 618 restrained from axial movement in direction 702 by the pin 712, the second linkage 648 can be urged to flex or rotate as described above. This flexion or rotation of the second linkage 648 urges the second foot pad 666 from the second radial distance 690 (shown in FIG. 6) to a fourth radial distance 736 (shown in FIG. 7). The fourth radial distance 736 can be different than the second radial distance 690, and in this example of the third collar 626 moving from the third position 678 (shown in FIG. 6) to the fourth position 728 (shown in FIG. 7), the fourth radial distance 736 can be greater than the second radial distance 690.

As noted previously, in some examples, the mounting device 600 can include multiple first linkages 632 and multiple second linkages 648, and two first foot pads 662 can be diametrically opposed one another such that the two first foot pads 662 include outward facing surfaces that are located at a second diameter 738 when the first collar 602 is located in the second position 700 (shown in FIG. 7). Similarly, two second foot pads 666 can be diametrically opposed one another such that the two second foot pads 666 include outward facing surfaces that are located at a fourth diameter 740 when the third collar 626 is located in the fourth position 728. In some examples, the multiple linkages 632, 648 are spaced equally around a circumference of the central shaft 606.

Regardless of whether two first foot pads 662 are diametrically opposed, the third radial distance 726 for each of all the first foot pads 662 can be equal, effectively placing each of the first foot pads 662 on or near a single circumference of a circle having the second diameter 738. The same can be true for the second foot pads 666 as well; the fourth radial distance 736 for each of all the second foot pads 666 can be equal, effectively placing each of the second foot pads 666 on or near a single circumference of a circle having the fourth diameter 740. In some examples, at least one of the second diameter 738 or the fourth diameter 740 can be greater than an inside diameter of a standard tube or standard pipe.

In some examples, the third radial distance 726 can be equal to the fourth radial distance 736 such that the first foot pads 662 are located the same distance from the central shaft 606 as the second foot pads 666. In some examples, such as placement of the mounting device 600 into the vent pipe 400 that has a non-constant diameter along an axis, the third radial distance 726 can be different than the fourth radial distance 736.

Figure 8:
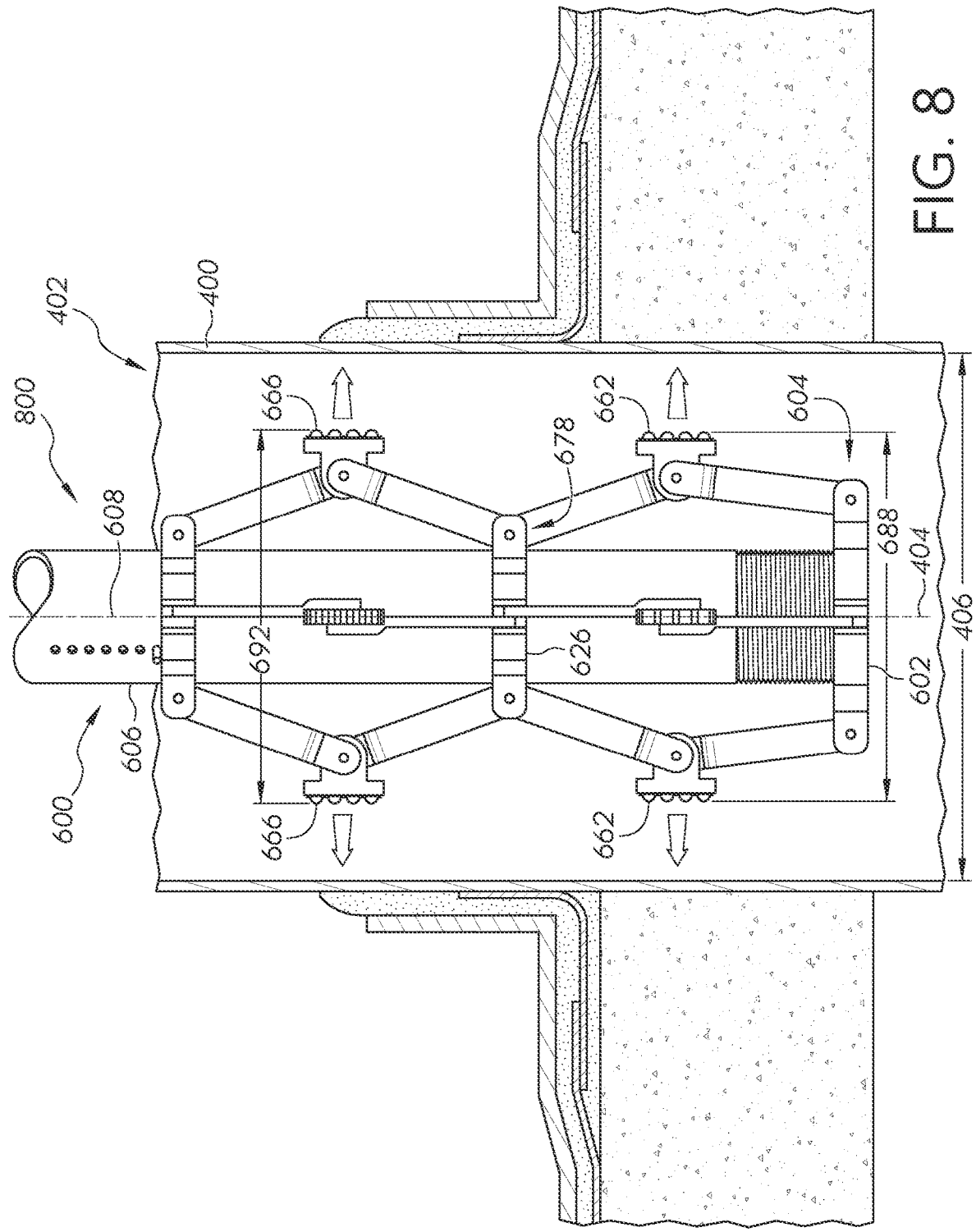
FIG. 8 illustrates the mounting device within an object, the first collar located at the first position.

Referring to FIG. 8, the mounting device 600 is illustrated within the vent pipe 400 while the first collar 602 is located at the first position 604. The vent pipe 400 of FIG. 8 is the same or similar to the vent pipe 400 shown in FIGS. 4 and 5. The structure 100 and the roof 104 are not discussed further here for brevity, but can be the same as those previously described. The mounting device 600 can be placed into the vent pipe 400 through the opening 402 defined by an exposed end of the vent pipe 400 above the roof 104. In some examples, the axis 608 of the mounting device 600 can be parallel to an axis 404 of the vent pipe 400. In some examples, the axis 608 of the mounting device 600 can be colinear with the axis 404 of the vent pipe 400.

As shown, the first diameter 688 between outward facing surfaces of the first foot pads 662 can be less than or equal to the inside diameter 406 of the vent pipe 400 such that the mounting device 600 can be relatively easily inserted within the inside diameter 406 of the vent pipe 400. This diameter comparison can be valid when the first collar 602 is located at the first position 604 and the third collar 626 is located at the third position 678. The second diameter 692 between outward facing surfaces of the second foot pads 666 can also be less than or equal to the inside diameter 406 of the vent pipe 400. The proportions of the first diameter 688 and the inside diameter 406 of the vent pipe 400 may be exaggerated in order to emphasize the difference between the first diameter 688 and the inside diameter 406.

In some examples, an upper portion 800 of the mounting device 600 will remain exposed outside of the vent pipe 400 in order to mount the device 106 (shown in FIG. 1) onto the central shaft 606.

Figure 9:
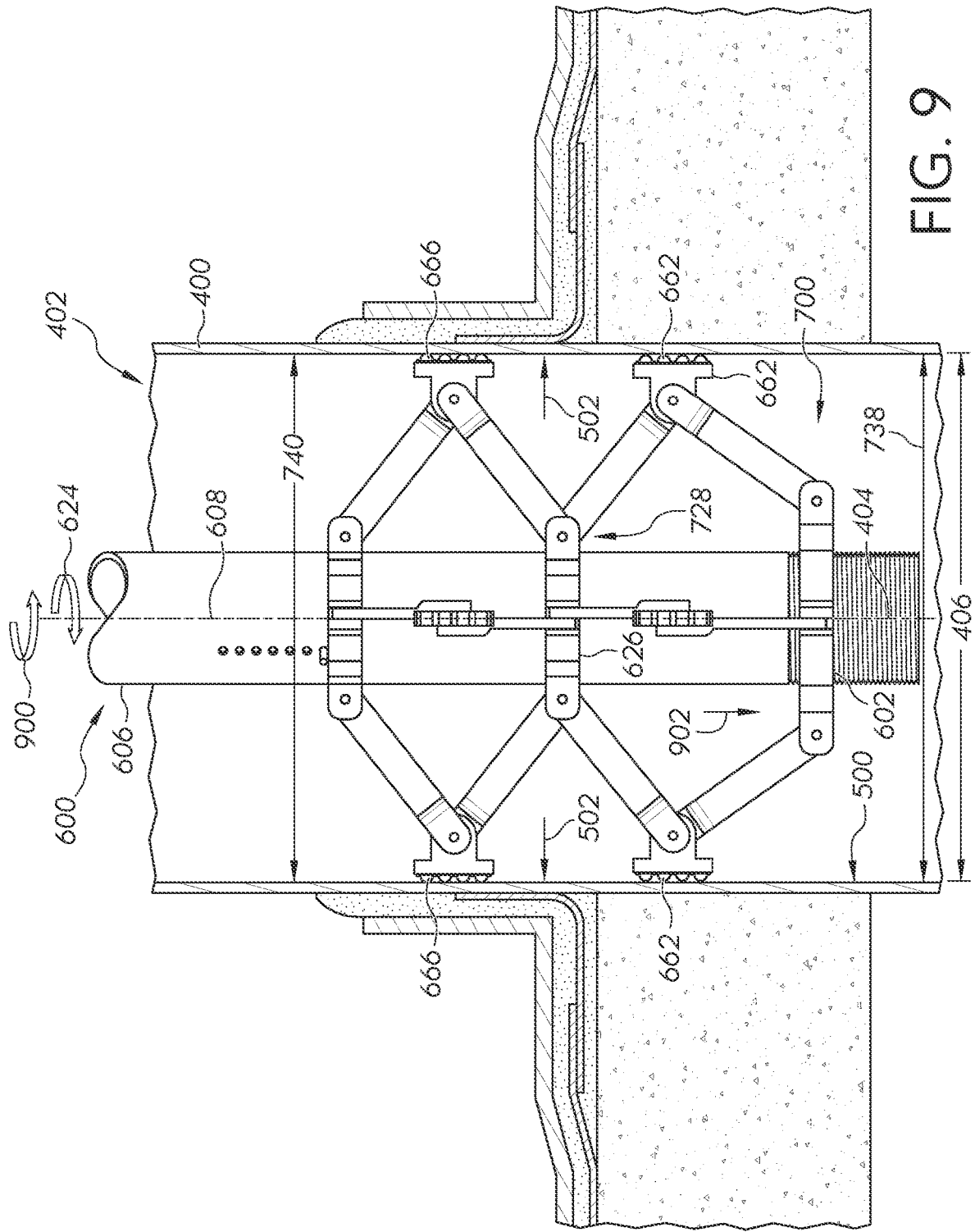
FIG. 9 is similar to FIG. 8 showing the first collar located at the second position.

Referring to FIG. 9, the mounting device 600 is illustrated within the vent pipe 400 while the first collar 602 is located in the second position 700 and the third collar 626 is located in the fourth position 728. As described previously, clockwise rotation of the central shaft 606 about the axis 608 according to arrow 624 urges the first collar 602 from the first position 604 to the second position 700 and increases the first diameter 688 of the first foot pads 662 to the second diameter 738. The second diameter 738 can be equal to or greater than the inside diameter 406 of the vent pipe 400. Movement of the first collar 602 urges the third collar 626 to the fourth position 728 and increases the second diameter 692 of the second foot pads 666 to the fourth diameter 740. The fourth diameter 740 can be equal to or greater than the inside diameter 406 of the vent pipe 400. The increase of the second diameter 692 and the fourth diameter 740 urges the first foot pads 662 and the second foot pads 666 against the interior surface 500 of the vent pipe 400 and apply the force 502 against the vent pipe 400 to secure the mounting device 600 to the vent pipe 400. The application of the force 502 against the vent pipe 400 can reduce or eliminate relative motion of the mounting device 600 relative to the vent pipe 400 to provide a stable mounting structure for the device 106.

In some examples, it may be beneficial to engineer and manufacture the first linkage 632 and the second linkage 648 such that the second diameter 738 and the fourth diameter 740 can be greater than the inside diameter 406 of the vent pipe 400, if the inside diameter 406 did not otherwise limit the second diameter 738 and the fourth diameter 740. With this arrangement, the elastomeric material of the first and second foot pads 662, 666 can elastically compress against the interior surface 500 of the vent pipe 400 to enable greater stability of the mounting device 600 when it is mounted within the vent pipe 400. Additionally, some elements such as the first link 642 and the second link 644 of the first linkage 632 can be elastically deformed (e.g., compressed) when the first collar 602 is located in the second position 700 and the first and second foot pads 662, 666 are acting against the interior surface 500 of the vent pipe 400. At least one of the compression of the first and second foot pads 662, 666 or the elastic deformation of the first and second links 236, 238 can help maintain the force 502 applied transverse to the axis 404.

To briefly summarize, movement of the first collar 602 from the first position 604 to the second position 700 urges the first foot pads 662 and the second foot pads 666 to contact the interior surface 500 of the vent pipe 400 into which the mounting device 600 can be placed. The contact between the first foot pads 662 and the second foot pads 666 and the interior surface 500 creates a force (represented by arrow 502) oriented transverse to the axis 404 to secure the mounting device 600 within the vent pipe 400. In some examples, the force 502 can be directed radially away from the axis 404 and can be perpendicular to the axis 404. It is to be understood that the force 502 can be applied by each of the first and second foot pads 662, 666 against the interior surface 500. In some examples, the force 502 applied by any of the first foot pads 662 and the second foot pads 666 may vary from the force 502 applied by any other of the foot pads 662, 666 due to manufacturing tolerances or other factors. Unless and until the central shaft 606 is rotated in a counterclockwise direction, the force 502 will remain acting between the foot pads 662, 666 and the interior surface 500 to provide a relatively strong mounting base for the device 106 to withstand reasonably expected weather elements, wind forces, accidental impacts, etc. in order to mount the mounting device 600 to the structure 100.

As previously noted, counterclockwise rotation (represented by arrow 900) of the central shaft 606 will urge the first collar 602 in a direction (represented by arrow 902) along the axis 608 from the second position 700 toward the first position 604. With counterclockwise rotation, the first axial distance can be the distance 704 (shown in FIG. 7) and can be greater than the second axial distance which can be the distance 670 (shown in FIG. 6). Rotation in the counterclockwise direction 900 urges the first collar 602 away from the third collar 626 (e.g., generally toward the bottom of the figure in FIGS. 8 and 9). In some examples, this direction 902 can be parallel to the axis 608. In some examples, the direction 902 can be generally parallel to the axis 608, or within 5° of axis 608.

To this point, the disclosure has discussed right-hand threads formed into the threaded exterior surface portion 614 of the central shaft 606 at the first end 610 or proximate the first end 610. It is to be understood that if the discussed threaded surfaces instead define left-hand threads, the previously described rotations and motions of collars 602, 626 will be reversed. As with previous examples, the mounting device 600 can include a handle or other suitable device attached to the central shaft 606 configured to ease rotation of the central shaft 606 during an installation or a removal operation of the mounting device 600.

Figure 10:
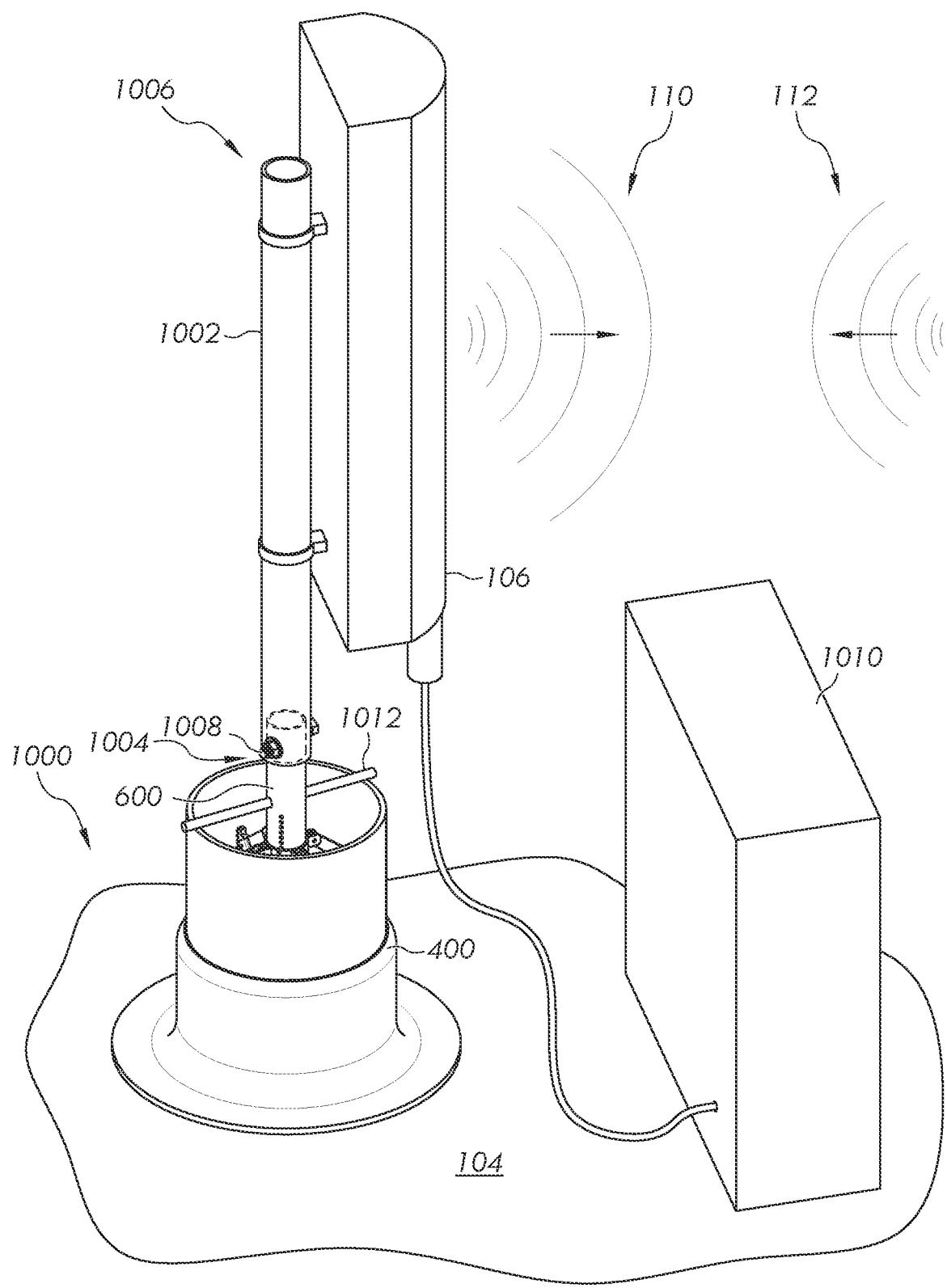
FIG. 10 is a schematic representing the mounting device mounting a telecommunications device to a location.

Referring to FIG. 10, a schematic representing the mounting device 600 mounting a telecommunications device 106 to a location 1000 is illustrated. In the shown example, the telecommunication device 106 can be a 5G fixed wireless access node that is mounted to a rooftop of an occupied building, however many other devices and structures may be used in connection with this disclosure. As shown, the mounting device 600 can be secured to the vent pipe 400 that passes from an interior space of the building through the roof 104 to an exterior space above the roof 104.

In some examples, a central shaft extension 1002 can be attached to the central shaft 606. The central shaft extension 1002 extends from a first end 1004 to a second end 1006, and the first end 1004 can be configured to attach to the second end 612 of the central shaft 606 that extends away from the utility pipe (e.g., the vent pipe 400). The central shaft extension 1002 can be configured to cooperate with the apertures 710 (shown in FIG. 7) defined by the central shaft 606 to fasten the central shaft extension 1002 to the central shaft 606. In the shown example, at least one of a threaded fastener 1008 (e.g., a bolt) secures the central shaft extension 1002 to the central shaft 606. However, the threaded fastener 1008 is merely an example, and any suitable structures and methods of attachment are satisfactory. The second end 1006 can be configured to cooperate with a telecommunication device 106 to mount the telecommunication device 106 at an elevation above the location 1000. Again, any suitable structures and method of attachment are satisfactory to secure the device 106 to the central shaft extension 1002.

There may also be examples of the mounting device 600 that do not include the central shaft extension 1002, and the device 106 can be can be secured directly to the central shaft 606.

It is to be understood that each of the mounting device 600 and the central shaft extension 1002 can be engineered and constructed to locate the device 106 at a particular elevation or height above the location (e.g., the roof 104) or at a range of elevation or heights above the location. Attaching or securing the device 106 at a particular height can be useful to optimize the performance of the device 106 to transmit electronic data transmissions 110 and receive electronic data transmissions 112. For example, the electronic data transmissions 110, 112 may need to be received and/or transmitted above a roof wall 1010, parapet, or other similar structure associated with the roof 104.

The mounting device 600 can also include a depth limiter 1012 attached to the central shaft 606. The depth limiter 1012 has a dimension, such as a length, that can be greater than a dimension (e.g., the inside diameter 406) of an interior space of the object (e.g., the vent pipe 400) into which the mounting device 600 is placed. The depth limiter 1012 can limit a depth of insertion of the mounting device 600 within the vent pipe 400. Simply stated, the depth limiter 1012 can include a portion that can be larger than the opening of the vent pipe 400 to reduce or eliminate the possibility of the mounting device 600 unintentionally being placed too far into the vent pipe 400. While shown as a rod or pin, the depth limiter 1012 can include any number of structures that cooperate with the vent pipe 400 to limit the depth of insertion of the mounting device 600.

Figure 11:
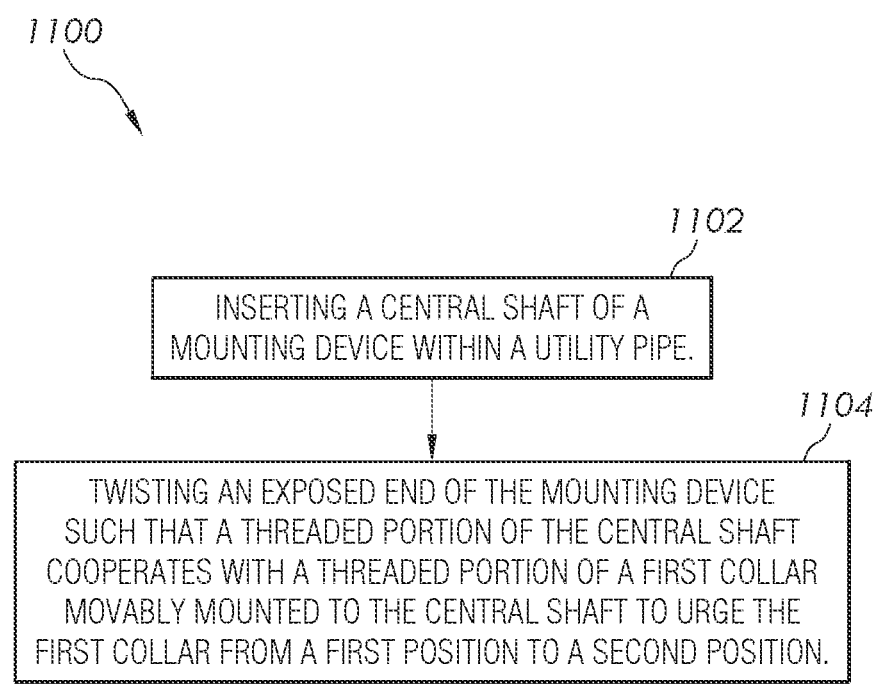
FIG. 11 is a top-down flow chart illustrating a method of securing the mounting device to the location.

Referring to FIG. 11, a top-down flow chart illustrating a method 1100 of securing the mounting device to the location is illustrated. In many examples, an installer or operator can gain access to the roof 104 to install or secure a telecommunications device to the roof 104 of a building or structure. The installer can ensure the first collar is in the first position such that the mounting device can be placed into the object (e.g., the vent Pipe).

The installer can begin by inserting the central shaft of the mounting device within the utility pipe 1102 (e.g., the vent pipe) extending from the location (e.g., the roof) such that the central shaft includes an exposed end that remains external of the utility pipe.

After inserting the central shaft of the mounting device within the vent pipe, the installer can proceed by twisting the exposed end of the central shaft such that the threaded portion of the central shaft cooperates with threads of the first collar. The first collar is movably mounted to the central shaft, and the rotation of the central shaft urges the first collar from the first position to the second position 1104. Movement of the first collar from the first position to the second position urges the linkage attached to the first collar to expand radially within the utility pipe to urge the foot pad(s) connected to the linkage into contact with the interior surface of the utility pipe. The force created by the linkage expansion creates a radial force between the foot pad(s) and the interior surface of the utility pipe to secure the mounting device within the utility pipe.

As noted previously, the installer can then proceed by attaching the central shaft extension to the central shaft. The central shaft extension extends from a first end to a second end. In some examples, the installer engages the first end of the central shaft extension with the second end of the central shaft. The method can continue by attaching the fastener to at least one of the central shaft extension or the central shaft to secure the central shaft extension to the central shaft.

The second end of the central shaft extension can be configured to cooperate with the telecommunication device to mount or secure the telecommunication device at a desired elevation above the location. The method continues by mounting a telecommunication device at the desired elevation above the location via the mounting device. In some examples, the telecommunication device can be a 5G fixed wireless access node.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A mounting device comprising:
   a central shaft extending along an axis from a first end to a second end;
   a first collar mounted to the central shaft;
   a second collar mounted to the central shaft;
   a linkage extending from a first portion to a second portion, the first portion of the linkage attached to the first collar, and the second portion of the linkage attached to the second collar, the linkage having an inflection point located between the first portion and the second portion; and
   a foot pad attached to the linkage proximate the inflection point, wherein:
   the first collar is movable, due to inflection of the linkage about the inflection point, from a first position located a first axial distance from the first end to a second position located a second axial distance from the first end, the first axial distance different than the second axial distance, and
   when the first collar is located in the first position, the foot pad is located a first radial distance from the axis, and when the first collar is located in the second position, the foot pad is located a second radial distance from the axis, the first radial distance is different than the second radial distance.

2. The mounting device of claim 1, the linkage comprising:
   a first link attached to the first collar; and
   a second link attached to the second collar, the second link movably attached to the first link at a link joint located at the inflection point, and the foot pad attached to the link joint.

3. The mounting device of claim 1, wherein:
   the central shaft includes a threaded exterior surface portion proximate the first end,
   the first collar includes a threaded interior surface, and
   the first collar is movably mounted to the central shaft by engaging the threaded interior surface of the first collar with the threaded exterior surface portion of the central shaft such that rotation of the central shaft urges the first collar in a direction along the axis from the first position to the second position.

4. The mounting device of claim 1, wherein the central shaft defines an aperture, the aperture configured to cooperate with a pin such that the pin provides a physical interference with the second collar to maintain a minimum separation distance between the second collar and the second end of the central shaft.

5. The mounting device of claim 1, wherein the foot pad comprises an elastomeric material.

6. The mounting device of claim 1, comprising a structure configured to limit a rotational motion of the first collar during a rotational motion of the central shaft.

7. The mounting device of claim 1, comprising a depth limiter attached to the central shaft, the depth limiter having a dimension that is greater than a dimension of an interior space of an object into which the mounting device is placed to limit a depth of insertion of the mounting device within the object.

8. The mounting device of claim 1, wherein movement of the first collar from the first position to the second position urges the foot pad to contact an interior surface of an object into which the mounting device is placed and creates a force oriented transverse to the axis to secure the mounting device within the object.

9. A mounting device comprising:
a central shaft extending along an axis from a first end to a second end;
a first collar mounted to the central shaft;
a second collar mounted to the central shaft;
a third collar mounted to the central shaft, the third collar located between the first collar and the second collar;
a first linkage extending from a first portion to a second portion, the first portion of the first linkage attached to the first collar, and the second portion of the first linkage attached to the third collar, the first linkage having a first inflection point located between the first portion and the second portion of the first linkage;
a second linkage extending from a first portion to a second portion, the first portion of the second linkage attached to the third collar, and the second portion of the second linkage attached to the second collar, the second linkage having a second inflection point located between the second portion and the first portion of the second linkage;
a first foot pad attached to the first linkage proximate the first inflection point; and
a second foot pad attached to the second linkage proximate the second inflection point, wherein:
the first collar is movable, due to at least one of inflection of the first linkage about the first inflection point or inflection of the second linkage about the second inflection point, from a first position located a first axial distance from the first end to a second position located a second axial distance from the first end, the first axial distance different than the second axial distance,
the third collar is movable, due to at least one of inflection of the first linkage about the first inflection point or inflection of the second linkage about the second inflection point, from a third position located a third axial distance from the first end to a fourth position located a fourth axial distance from the first end, the third axial distance different than the fourth axial distance,
when the first collar is located in the first position and the third collar is located in the third position, the first foot pad is located a first radial distance from the axis and the second foot pad is located a second radial distance from the axis,
when the first collar is located in the second position and the third collar is located in the fourth position, the first foot pad is located a third radial distance from the axis and the second foot pad is located a fourth radial distance from the axis, and the first radial distance is different than the third radial distance and the second radial distance is different than the fourth radial distance.

10. The mounting device of claim 9, wherein movement of the first collar from the first position to the second position and movement of the third collar from the third position to the fourth position urges the first foot pad and the second foot pad to contact an interior surface of an object into which the mounting device is placed and creates a force oriented transverse to the axis to secure the mounting device within the object.

11. The mounting device of claim 9, wherein a first difference between the first axial distance and the second axial distance is greater than a second difference between the third axial distance and the fourth axial distance.

12. The mounting device of claim 9, comprising a handle attached to the central shaft, the handle configured to ease rotation of the central shaft during an installation or a removal operation.

13. The mounting device of claim 9, comprising:
a central shaft extension extending from a first end to a second end, the first end of the central shaft extension configured to attach to the central shaft, and the second end of the central shaft extension configured to cooperate with a telecommunication device for mounting of the telecommunication device to a location via the mounting device.

14. The mounting device of claim 13, wherein the central shaft extension is configured to cooperate with at least one aperture defined by the central shaft to fasten the central shaft extension to the central shaft.

15. A method to secure a mounting device to a location, the method comprising:
inserting a central shaft of the mounting device within a utility pipe extending from the location such that the central shaft includes an exposed end that remains external of the utility pipe; and
twisting the exposed end such that a threaded portion of the central shaft cooperates with threads of a first collar movably mounted to the central shaft to urge the first collar from a first position to a second position, wherein movement of the first collar from the first position to the second position urges a linkage attached to the first collar to expand radially within the utility pipe to urge a foot pad, connected to the linkage, into contact with an interior surface of the utility pipe and thereby create a radial force between the foot pad and the interior surface of the utility pipe to secure the mounting device within the utility pipe.

16. The method of claim 15, comprising:
attaching a central shaft extension to the central shaft, the central shaft extension extending from a first end to a second end, the first end configured to attach to an end of the central shaft that extends away from the utility pipe, the second end configured to cooperate with a telecommunication device to mount the telecommunication device at an elevation above the location.

17. The method of claim 16, wherein the central shaft extension is configured to cooperate with at least one aperture defined by the central shaft to fasten the central shaft extension to the central shaft.

18. The method of claim 16, wherein attaching the central shaft extension to the central shaft comprises:
engaging the first end of the central shaft extension with the second end of the central shaft; and attaching a fastener to at least one of the central shaft extension or the central shaft to secure the central shaft extension to the central shaft.

19. The method of claim 15, comprising:

mounting a telecommunication device at an elevation above the location via the mounting device.

20. The method of claim 15, wherein the utility pipe comprises a roof termination of at least one of a vent pipe or a vent stack.

* * * * *